United States Patent
Peterson et al.

(10) Patent No.: US 10,715,518 B2
(45) Date of Patent: Jul. 14, 2020

(54) DETERMINATION OF DEVICE WITH WHICH TO ESTABLISH COMMUNICATION BASED ON BIOMETRIC INPUT

(71) Applicant: Lenovo (Singapore) Pte. Ltd., New Tech Park (SG)

(72) Inventors: Nathan J. Peterson, Oxford, NC (US); Arnold S. Weksler, Raleigh, NC (US); John Carl Mese, Cary, NC (US); Russell Speight VanBlon, Raleigh, NC (US)

(73) Assignee: Lenovo (singapore) pte. ltd., Singapore (SG)

( * ) Notice: Subject to any disclaimer, the term of this patent is extended or adjusted under 35 U.S.C. 154(b) by 146 days.

(21) Appl. No.: 14/962,002

(22) Filed: Dec. 8, 2015

(65) Prior Publication Data

US 2017/0163637 A1 Jun. 8, 2017

(51) Int. Cl.
*H04L 29/06* (2006.01)
*H04W 4/80* (2018.01)
(Continued)

(52) U.S. Cl.
CPC .......... *H04L 63/0861* (2013.01); *H04L 63/04* (2013.01); *H04W 4/80* (2018.02);
(Continued)

(58) Field of Classification Search
CPC ..... H04L 63/0861; H04L 63/04; H04L 67/12; H04W 4/008; H04W 12/06; H04W 4/80; H04W 12/08; G06F 21/32
(Continued)

(56) References Cited

U.S. PATENT DOCUMENTS 8,316,436 B2 11/2012 Shirai et al.
8,499,164 B2* 7/2013 Ortiz .................. H04L 63/0861
713/182

(Continued)

FOREIGN PATENT DOCUMENTS

CN 103310142 A 9/2013
WO 2015016524 A1 2/2015

OTHER PUBLICATIONS

Rod David Waltermann, Russell Speight Vanblon, Nathan J. Peterson, Arnold S. Weksler, John Carl Mese, "Authentication Based on Body Movement", related U.S. Appl. No. 14/643,132, Examiner's Answer dated Feb. 10, 2017.

(Continued)

*Primary Examiner* — Oleg Korsak
*Assistant Examiner* — Feliciano S Mejia
(74) *Attorney, Agent, or Firm* — John M. Rogitz; John L. Rogitz

(57) ABSTRACT

In one aspect, a first device includes a processor, a wireless transceiver accessible to the processor, at least one biometric sensor accessible to the processor, and storage accessible to the processor. The storage bears instructions executable by the processor to receive input from the at least one biometric sensor, identify a user based on input from the at least one biometric sensor, and determine a second device with which the first device is to communicate using the wireless transceiver based at least in part on identification of the user based on input from the at least one biometric sensor.

20 Claims, 5 Drawing Sheets

(51) Int. Cl.
*H04W 12/00* (2009.01)
*H04W 12/06* (2009.01)

(52) U.S. Cl.
CPC ......... *H04W 12/003* (2019.01); *H04W 12/06* (2013.01); *H04W 12/00503* (2019.01)

(58) Field of Classification Search
USPC ................ 726/7; 382/124; 713/168, 186
See application file for complete search history.

(56) References Cited

U.S. PATENT DOCUMENTS

| | | | | |
|---|---|---|---|---|
| 8,781,791 | B2* | 7/2014 | Panther | G06F 3/011 |
| | | | | 702/160 |
| 8,994,498 | B2* | 3/2015 | Agrafioti | G06F 21/40 |
| | | | | 340/5.82 |
| 9,232,402 | B2* | 1/2016 | Horton | H04W 12/08 |
| 9,646,146 | B2* | 5/2017 | LaCous | G06F 21/32 |
| 10,040,423 | B2* | 8/2018 | Boesen | A61B 5/6803 |
| 2005/0114654 | A1 | 5/2005 | Brackett et al. | |
| 2009/0133106 | A1 | 5/2009 | Bentley et al. | |
| 2010/0082444 | A1* | 4/2010 | Lin | G06Q 20/042 |
| | | | | 705/17 |
| 2014/0142403 | A1 | 5/2014 | Brumback et al. | |
| 2014/0165185 | A1 | 6/2014 | Lange | |
| 2014/0354529 | A1 | 12/2014 | Laughlin et al. | |
| 2014/0366111 | A1 | 12/2014 | Sheller et al. | |
| 2015/0028996 | A1 | 1/2015 | Agrafioti et al. | |
| 2015/0149375 | A1* | 5/2015 | Thompson | G06Q 30/0279 |
| | | | | 705/319 |
| 2015/0168996 | A1 | 6/2015 | Sharpe et al. | |
| 2015/0169858 | A1 | 6/2015 | Tg | |
| 2015/0235098 | A1 | 8/2015 | Lee et al. | |
| 2015/0269936 | A1 | 9/2015 | Alameh et al. | |
| 2015/0287318 | A1* | 10/2015 | Nair | G08C 17/02 |
| | | | | 340/5.52 |
| 2015/0341349 | A1 | 11/2015 | Mandal et al. | |
| 2015/0341350 | A1 | 11/2015 | Mandal et al. | |
| 2015/0350200 | A1 | 12/2015 | Li et al. | |
| 2016/0078771 | A1 | 3/2016 | Zhuang et al. | |
| 2016/0149881 | A1 | 5/2016 | Rengan | |
| 2016/0366188 | A1* | 12/2016 | Smith | H04L 63/101 |

OTHER PUBLICATIONS

Rod David Waltermann, Russell Speight Vanblon, Nathan J. Peterson, Arnold S. Weksler, John Carl Mese, "Authentication Based on Body Movement", related U.S. Appl. No. 14/643,132, Reply Brief filed Mar. 28, 2017.

Rod David Waltermann, Russell Speight Vanblon, Nathan J. Peterson, Arnold S. Weksler, John Carl Mese, "Authentication Based on Body Movement", related U.S. Appl. No. 14/962,002, Final Office Action dated Jul. 7, 2016.

Rod David Waltermann, Russell Speight Vanblon, Nathat J. Peterson, Arnold S. Weksler, John Carl Mese, "Authentication Based on Body Movement", related U.S. Appl. No. 14/643,132, applicants response to non-final office action filed May 12, 2016.

Rod D. Waltermann, Russell Speight Vanblon, Nathan J. Peterson, Arnold S. Weksler, John Carl Mese, "Authentication Based on Body Movement", file history of related application U.S. Appl. No. 14/643,132 filed Mar. 10, 2015.

Rod David Waltermann, Russell Speight Vanblon, Nathan J. Peterson, Arnold S. Weksler, John Carl Mese, "Authentication Based on Body Movement", related U.S. Appl. No. 14/643,132, Non-Final Office Action dated Feb. 22, 2016.

Rod David Waltermann, Russell Speight Vanblon, Nathan J. Peterson, Arnold S. Weksler, John Carl Mese, "Authentication Based on Body Movement", related pending U.S. Appl. No. 14/643,132, Applicant's response to Final Office Action filed Oct. 7, 2016.

Rod David Waltermann, Russell Speight Vanblon, Nathan J. Peterson, Arnold S. Weksler, John Carl Mese, "Authentication Based on Body Movement", related U.S. Appl. No. 14/643,132, Board Decision dated Dec. 18, 2017.

Rod David Waltermann, Russell Speight Vanblon, Nathan J. Peterson, Arnold S. Weksler, John Carl Mese, "Authentication Based on Body Movement", related U.S. Appl. No. 14/643,132, Applicant's response to Board Decision filed Dec. 18, 2017.

Nathan J. Peterson, Arnold S. Weksler, John Carl Mese, Russell Speight Vanblon, "Determination of Device with Which to Establish Communication Based on Biometric Input", related U.S. Appl. No. 14/962,002, Non-Final Office Action dated Nov. 16, 2017.

* cited by examiner

| Bioimpedance | User / ID # | Device |
|---|---|---|
| A-B | Nathan; 001 | Phone 1 |
| X-Y | Amie; 002 | Phone 2 |

FIG. 6

DETERMINATION OF DEVICE WITH WHICH TO ESTABLISH COMMUNICATION BASED ON BIOMETRIC INPUT

FIELD

The present application relates generally to determination of a device with which to establish communication based on biometric input.

BACKGROUND

As recognized herein, wearable devices such as smart watches often connect to another device for communication therewith based on a most-recent device with which the wearable device communicated in the past. As also recognized herein, this can be undesirable and confusing if the wearable device is shared amongst people who may be wearing it at different times to communicate with other respective devices since the wearable device may automatically begin communicating with another device with which it previously communicated but that is not associated with the current user.

SUMMARY

Accordingly, in one aspect a device includes a processor, a wireless transceiver accessible to the processor, at least one biometric sensor accessible to the processor, and storage accessible to fee processor. The storage bears instructions executable by the processor to receive input from the at least one biometric sensor, identify a user based on input from the at least one biometric sensor, and determine a second device with which the first device is to communicate using the wireless transceiver based at least in part on identification of the user based on input from the at least one biometric sensor.

In another aspect, a method includes receiving input at a first device from a biometric sensor and, based at least in part on the input from the biometric sensor, identifying a second device with which the first device is to communicate.

In still another aspect, an apparatus includes a first processor, a network adapter, and storage. The storage bears instructions executable by a second processor of a first device for receiving input at the first device from a biometric sensor and, based at least in part on the input from the biometric sensor, identifying a second device with which the first device is to communicate. The first processor transfers the instructions over a network via the network adapter.

The details of present principles, both as to their structure and operation, can best be understood in reference to the accompanying drawings, in which like reference numerals refer to like parts, and in which:

BRIEF DESCRIPTION OF THE DRAWINGS

FIG. 6 is an example data table in accordance with present principles.

DETAILED DESCRIPTION

Figure 1:
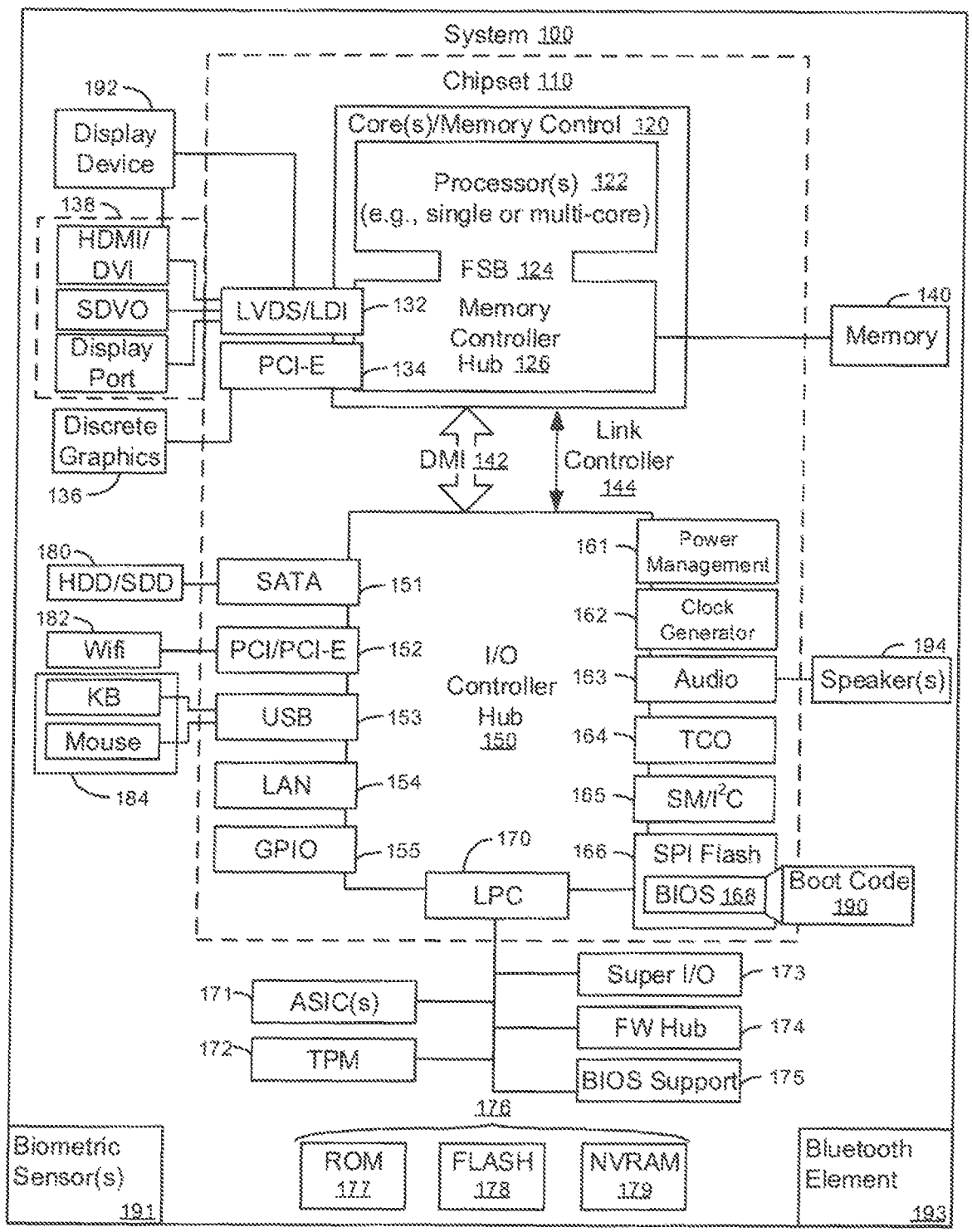
FIG. 1 is a block diagram of an example system in accordance with present principles.

With respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple, Google, or Microsoft. A Unix or similar such as Linux operating system may be used. These operating systems can execute one or more browsers such as a browser made by Microsoft or Google or Mozilla or other browser program that can access web applications hosted by the Internet servers over a network such as the Internet, a local intranet, or a virtual private network.

As used herein, instructions refer to computer-implemented steps for processing information in the system. Instructions can be implemented in software, firmware or hardware; hence, illustrative components, blocks, modules, circuits, and steps are set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed, in addition to a general purpose processor, in or by a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Any software and/or applications described by way of flow charts and/or user interfaces herein can include various sub-routines, procedures, etc. It is to be understood that logic divulged as being executed by, e.g., a module can be redistributed to other software modules and/or combined together in a single module and/or made available in a shareable library.

Logic when implemented in software, can be written in an appropriate language such as but not limited to C # or C++, and can be stored on or transmitted through a computer-readable storage medium (e.g., that may not be a transitory signal) such as a random access memory (RAM), read-only memory (RDM), electrically erasable programmable read-only memory (EEFROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and twisted pair wires. Such connections may include wireless communication connections including infrared and radio.

In an example, a processor can access Information over its input lines from data storage, such as the computer readable storage medium, and/or the processor can access information wirelessly from an internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depleted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, S and C together, and/or A, B, and C together, etc.

"A system having one or more of A, B, and C" (likewise "a system having one or more of A, B, or C" and "a system having one or more of A, B, C") includes systems that have A alone, B alone, C alone, A and B together, A and C together, B and C together, and/or A, B, and C together, etc.

The term "circuit" or "circuitry" may fee used in the summary, description, and/or claims. As is well known in the art, the term "circuitry" includes ail levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 maybe, e.g., a game console such as XBOX® or Playstation®, and/or the system 100 may include a wireless telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory".

The memory controller hub 126 can further include a low-voltage differential signaling interface (LVDS) 132. The LVDS 132 may be a so-called LVDS Display Interface (LDI) for support of a display device 192 (e.g., a CRT, a flat panel a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that may not be transitory signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

The system 100 also comprises at least one biometric sensor 191 configured for sensing one or more respective biometrics of a user in accordance with present principles. For example, the biometric sensor(s) 191 may be one or more of: a bioimpedance sensor, an electromyograph, a heart rate and/or pattern sensor, a pulse sensor, a fingerprint sensor, a vein sensor, a retina and/or iris sensor, a blood pressure sensor, a perspiration sensor, an odor and/or scent sensor, a body temperature sensor, a lung input/output sensor, a facial recognition sensor, a DNA sensor, an oxygen sensor (e.g., blood oxygen sensors and/or VO2 max sensors), a glucose and/or blood sugar sensor, a voice sensor, a lung input/output sensor, a brain activity sensor, etc. Furthermore, the system 100 may include a Bluetooth and/or Bluetooth low energy (BLE) communication element 193 (e.g., a Bluetooth 4.0 communication element) for communicating with other devices in accordance with present principles using Bluetooth communication protocols. In addition to or in lieu of the foregoing, the element 193 may be a near field communication (NFC) element for communicating using with other devices in accordance with present principles NFC protocols, and/or the element 193 may be another type of communication element for communication with other devices in accordance with present principles.

Additionally, though now shown for clarity, in some embodiments the system 100 may include a gyroscope that senses and/or measures the orientation of the system 100 and provides input related thereto to the processor 122, an accelerometer that senses acceleration and/or movement, of the system 100 and provides input related thereto to the processor 122, an audio receiver/microphone that provides input to the processor 122 based on audio that is detected, such as via a user providing audible input to the microphone, and a camera that gathers one or more images and provides input related thereto to the processor 122. The camera may be a thermal imaging camera, a digital camera such as a webcam, a three-dimensional (3D) camera, and/or a camera otherwise integrated into the system 100 and controllable by the processor 122 to gather pictures/images and/or video. Still further, and also not shown for clarity, the system 100 may include a GPS transceiver that is configured to receive geographic position information from at least one satellite and provide the information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
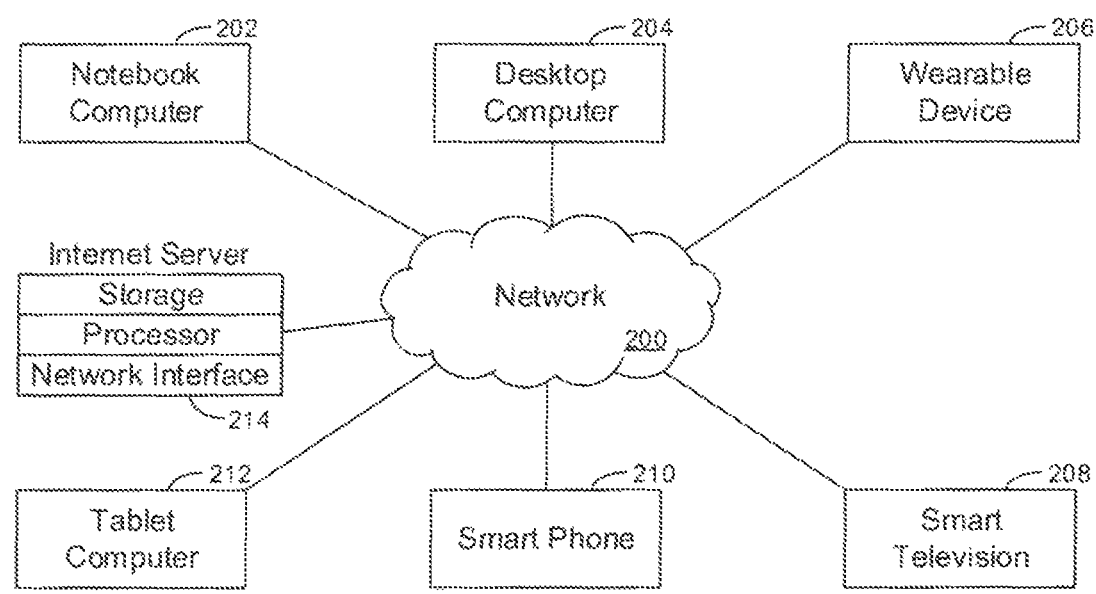
FIG. 2 is a block diagram of a network of devices in accordance with present principles.

Turning now to FIG. 2, example devices are shown communicating over a network 200 in accordance with present principles. It is to be understood that each of the devices described in reference to FIG. 2 may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 are configured to communicate with each other over the network 200 and/or directly via Bluetooth, NFC, etc. to undertake present principles.

Figure 3:
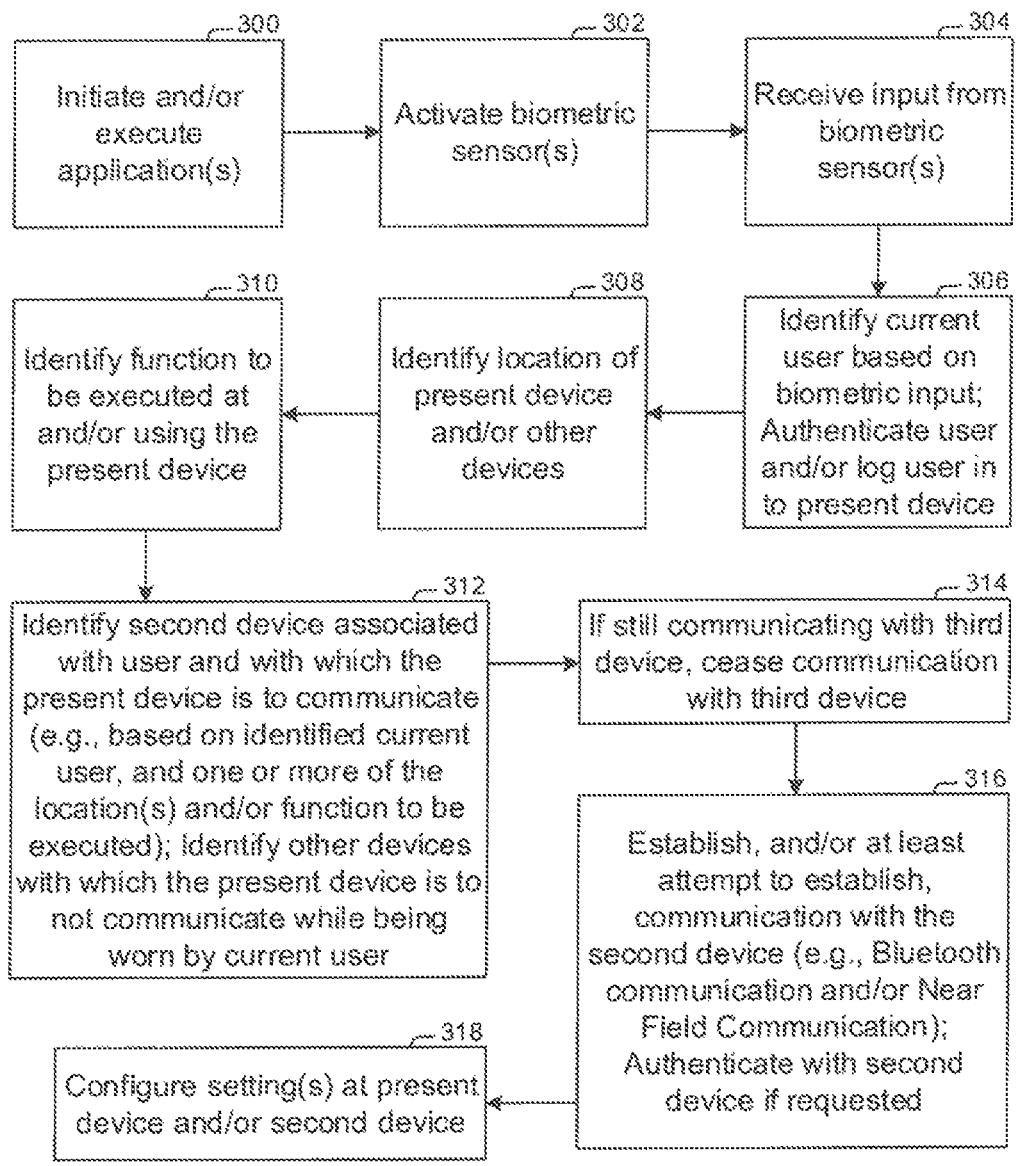
FIG. 3 is a flow chart showing an example algorithm in accordance with present principles.

Referring to FIG. 3, it shows example logic that may be undertaken by a device such as the system 100 in accordance with present principles (referred to when describing FIG. 3 as the "present device"). The logic of FIG. 3 may be executed by a device such as a smart watch, laptop, keyboard, mouse, etc. to identify a user based on one or more sensed biometrics of a user and determine another device with which the present device is to communicate based on the sensed biometric(s). Beginning at block 300, the logic initiates and/or executes one or more applications for undertaking present principles, such as a bioimpedance identification application, an electromyography identification application, a Bluetooth communication application, etc.

From block 300 the logic then proceeds to block 302, where the logic activates one or more biometric sensors at the present device and/or accessible to the present device and useful for undertaking present principles, such as a bioimpedance sensor, an electromyograph, a heart rate and/or pattern sensor, a fingerprint sensor, a vein sensor, a retina and/or iris sensor, a blood pressure sensor, an oxygen sensor (e.g., blood oxygen sensors and/or VO2 max sensors), a glucose and/or blood sugar sensor, a voice sensor, etc. After block 302 the logic next proceeds to block 304, where the logic receives input from the activated biometric sensor(s) that is indicative of at least one biometric of a user. Thus, it is to be understood that at or before block 304, the present device and/or biometric sensor is or has been placed into physical contact and/or proximity with a current user to thus measure at least one biometric of the current user.

From block 304, the logic of FIG. 3 proceeds to block 306. At block 306 the logic, in response to receipt of the biometric input at block 304, identifies the current user (e.g., a name) based on the biometric input. The current user may be identified by comparing the user-specific biometric input to data stored at the present device that correlates biometric inputs with users and/or with other devices respectively associated with the users. An example data table that may be used for this identification will be described below in reference to FIG. 6. In any case, but also at block 306, in some example embodiments the present device may also authenticate the current user at/to the present device based at least in part on the biometric input, and/or log the current user in to the present device based at least in part on the biometric input (e.g., identify a username and password accessible to the present device for login based on the biometric input).

After block 306, the logic may then proceed to block 308 where the logic may identify a location of the present device and/or other devices (e.g., based on information accessible to the present device such as respective GPS coordinates, network information, etc.). Then at block 310 the logic may identify a function to be executed at and/or using the present device, such as receiving text messages or emails from another device. The function to be executed may be identified based on predefined user settings for functions to be executed, based on applications currently running at the present device which may execute such a function, based on user input to a UI (such as to the UI 400 to be described below) to execute a particular function, etc. From block 310 the logic may then proceed to block 312, though in some embodiments the logic may advance, e.g., from block 306 directly to block 312.

In any case, at block 312 the logic identifies, based at least in part on the biometric input received at block 304 and/or current user identified at block 306, a second device associated with the biometric input and/or current user. The second device may be identified by comparing the user-specific biometric input and/or identified user to data stored at the present device that correlates the user-specific biometric input and/or the identified user with other devices associated with the current user. Thus, it is to be understood that in some embodiments at block 312, the logic may also determine other devices with which the present device is to not communicate while the identified user is using it (e.g., wearing the device to provide the biometric input or otherwise engaged with the device to provide the biometric input), such as devices paired with the present device and associated with other people but not the current user.

Note that although in some embodiments at block 312 the identification of the second device with which the present device is to communicate may be based solely on the biometric input and/or identified user, in some embodiments it may be further based on the location of the present device and/or one or more other devices identified as associated with the user. It may also be based on a function to be executed at or using the present device.

For example, in some embodiments the present device may identify the second device as a device with which the present device is to communicate via Bluetooth communication to receive text message and email alerts based on a comparison of GPS coordinates of the present device and second device, and/or an analysis of Bluetooth signal strength between, these devices, to determine if the second device is within a threshold distance to present device based on the coordinates and/or the determined signal strength (which itself may be proportional to and correlated to distance). Thus, the second device's GPS coordinates may have been received via the Internet and/or Bluetooth broadcast from the second device, and/or the measured signal strength of signals from the second device may be measured, and then this data may be used by the present device to determine whether to establish direct Bluetooth communication with the second device for receipt of forwarded text messages and emails from the second device based on whether the second device is within the threshold distance. Note that the threshold distance may be user-configurable and may be a distance less than a maximum distance at which the devices are able to communicate via Bluetooth communication.

As another example, the current user may have configured the present device to establish paired Bluetooth communication with different devices depending on the location of the present device. For instance, the present device may identity the location of the present device without attempting to identity the location of another device (though it may, in other embodiments), and then based on identification of the current user as wearing or using the present device and based on the current location of the present device it may at least attempt to establish paired Bluetooth communication with one device if at the current user's work location or with a different device if at the current user's home location.

As still another example, the current user may have configured the present device to establish paired Bluetooth communication with different devices depending on a function to be executed. For instance, the present device may identify that a function to be executed by the present device is receipt and presentation of text messages and telephone calls at the present device. Then based on identification of the current user as wearing or using the present device, and based on the functions to be executed, the present device may at least attempt to communicate via paired Bluetooth communication with one device of plural devices associated with the user and each paired with the present device for Bluetooth communication, where the device with which the present device attempts paired communication is determined to have a telephony transceiver for receiving calls and text messages that may then be forwarded to the present device, whereas other devices of the plural devices are determined to not have a telephony transceiver and/or the capability to forward incoming text messages and calls.

Still in reference to FIG. 3, from block 312 the logic next proceeds to block 314. At block 314 the logic may, if still maintaining a paired connection to a third device not associated with the current user, cease this communication and then at block 316 establish paired communication, or at least attempt to establish paired communication, with the second device identified at block 312. Note that although the paired communication may be Bluetooth communication as described in the examples above, in other embodiments it may be near field communication (NFC) and/or another type of wireless communication. Still further, at block 316 in some embodiments, the present device may authenticate itself and/or the current user with the second device using the biometric input, such as if the second device requests as much. The logic may also log the user in to the second device at block 316 based on the biometric input, a login name, password, etc. If requested.

Concluding the description of FIG. 3 with reference to block 318, the logic may move from block 316 to block 318, where in some embodiments the logic may configure one or more settings at the present device and/or the second device based on the biometric input and/or establishment of paired communication in response to the biometric input. For example, after identifying the user based on the biometric input, the logic may apply user-specific settings at the present device or second device, such as applying preferred call settings, launching certain applications, connecting to an electronic calendar associated with the identified user, logging in to a particular social networking account associated with the identified user, etc.

Before moving on to the description of other figures, it is to be understood that a paired communication as disclosed herein is understood to reference, in at least some embodiments, a relatively secure way of direct communication between two devices in which an encryption key(s) and/or personal identification number(s) (PIN) has been previously provided to and/or exchanged between the two devices and the devices have respectively authenticated each other (and/or been authenticated based on user input) to thus "link" or "bond" the devices. Notwithstanding, it is to be understood that paired communication may also be established based on a user providing biometric input of the same type to each of the devices separately (to sensors on each of the devices), which may then be used to establish, a pairing and/or unique encryption key for paired communication based on at least substantially the same biometric measurement being received at both devices. In any case, the device may then securely and directly communicate via paired communication through a communication channel using the encryption key(s) (e.g., via Bluetooth or NFC, and without needing to communicate with each other over another network such as the Internet and/or without an intermediary device having to facilitate communication between the devices).

If is also to be understood that present principles apply in instances other than a wearable device communicating with a smart phone. For example, present principles may be applied for a smart phone that communicates with a Bluetooth communication-enabled speaker, for a wireless keyboard or mouse that communicates with a computer, etc. But regardless, it is to be understood that user-specific biometric input may be received from a biometric sensor on one of these devices for the device to then identify the user and/or other data useful to identify another device with which to connect based on unique characteristics of the input that may differ from biometric input of others (e.g., a particular heartbeat rhythm, a particular electrical signal/signature/activity produced by a certain user's muscles as measured by an electromyograph, a particular level of bioimpedance of a certain user's skin as measured between two electrodes at least in part establishing a bioimpedance sensor, etc.).

If data other than a name of a particular user is used to identity another device wife which to communicate based on receipt of the user-specific biometric input in accordance with present principles, such data may comprise, but is not limited to, a particular numerical identifier or profile determined to be associated with a received measurement of biometric input which is then used to identify the device, a reference measurement of user-specific biometric input to which a received measurement may be compared and which is then used to identify the device based on a match to the received measurement, and/or a particular reference measurement range to which a received measurement may be compared and which is then used to identify the device based on a determination that the received measurement falls within the range, though it is to be understood that these types of data are associated with a particular user and/or, in effect, identify a particular user.

Figure 4:
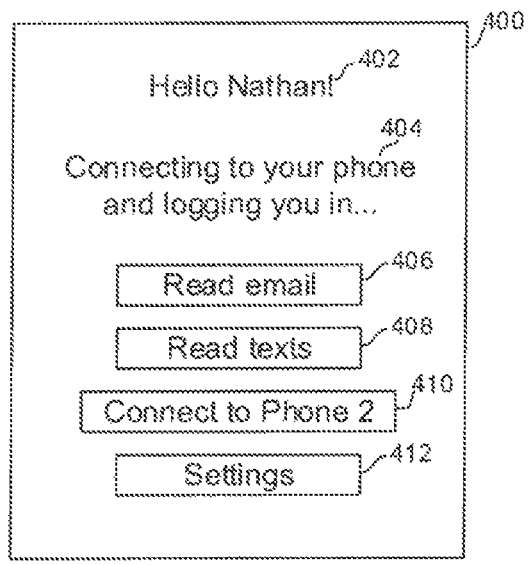
FIGS. 4 and 5 are example user interfaces (UIs) in accordance with present principles.

Continuing now in reference to FIG. 4, it shows an example user interface (UI) 400 presentable on a display of a device undertaking present principles and/or executing the logic of FIG. 3. The UI 400 includes a greeting 402 indicating a name/identifier of a user that was determined based on biometric input from the user. The UI 400 also includes a notification 404 that the device presenting the UI 400 is connecting for paired communication to another device and logging the user in to one or both devices.

Still further, the UI 400 of FIG. 4 may include first and second selectors 406 and 408 that are respectively selectable to provide input of a function desired to be executed by and/or using the device presenting the UI 400. This input may then be used in accordance with present principles, such as at blocks 310 and 312 in the logic described above. Example selector 406 is associated with receiving and presenting email messages at the device, and example selector 408 is associated with receiving and presenting text messages at the device.

The UI 400 may also include a selector 410 that is selectable to automatically without further user input cause the device to cease attempting to establish paired communication with the other device indicated in the notification 404 and instead attempt to establish paired communication with another device also determined to be associated with the user based on the biometric input from the user. Also presented on the UI 400 is a selector 412 that is selectable to automatically without further user input cause the device to present another UI for configuring settings for undertaking present principles, such as the UI 500 shown in FIG. 5.

The UI 500 includes a first selector 502 that is selectable to initiate a calibration process for the user to engage with the device presenting the UI 500 to provide biometric input which may then be associated with the user for later identification of the user based on subsequent biometric input of the same type from the user, which in turn may then be used to identify a device with which to establish paired communication as described herein. For example, during the calibration process, after receiving biometric input from the user, the device may present a UI on its display indicating that the biometric input has been received and indicating the type of biometric input (and/or the measurement itself), requesting entry to the UI of a name or other identifier to be associated with the user that provided the biometric input, and requesting entry to the UI of information pertaining to one or more other devices to associate with the user. These user inputs to the UI may be entered to the UI, for example, via text entry boxes presented on the UI, and then associations may be made based on the user input.

Figure 5:
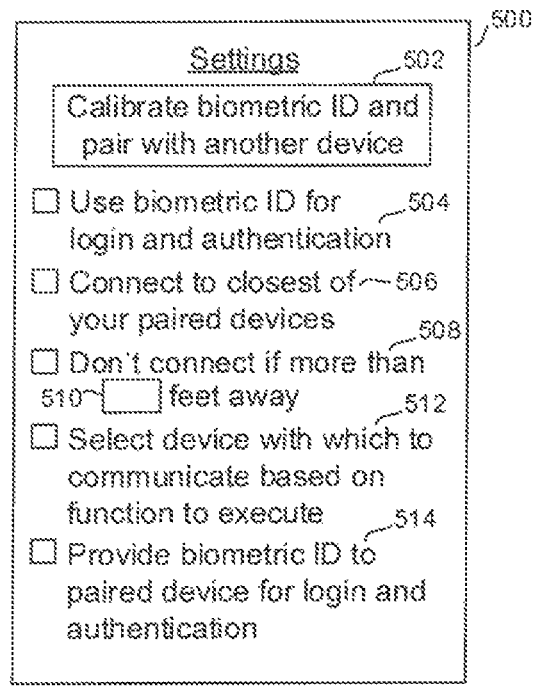

Still referring to FIG. 5, the UI 500 may also include a first option 504 selectable to use biometric input and/or identification for login and authentication to the device presenting the UI 500 (in addition to using it to determine another device with which to communicate). Also shown is a second option 506 selectable to configure the device to automatically establish paired communication with another device determined to be associated with the user based on that other device being determined to be a most proximate device to the device presenting the UI 500 than other devices farther away that are also associated with the user.

In addition to the foregoing, the UI 500 may include an option for a user to establish a threshold distance using number entry box 510 beyond which the device presenting the UI 500 will not establish paired communication with another device with which it is able to establish such communication even if associated with an identified user. FIG. 5 also shows that the UI 500 may include an option 512 selectable to configure the device presenting the UI 500 to select another device with which to establish paired communication based not only on biometric input from the user but also based on a function to be executed when such a function is identifiable. Even further, the UI 500 may include an option 514 selectable to provide biometric input received at the device presenting the UI 500 to another device with which pained communication is at least attempting to be established so that the biometric input and/or user ID determined therefrom may be used at the other device for login and authentication at the other device in accordance with present principles. Still in reference to FIG. 5, it is to also be understood that each of the options described above may be selected using the respective check box shown next to each option.

Now in reference to FIG. 6, it shows an example data table 600 that may be accessible to a device undertaking the logic of FIG. 3 to identity a user and/or device with which to establish paired communication based on received biometric input as described herein. The data table 600 includes a first column 602 listing, as example, various bioimpedance measurement ranges (expressed as variables in example FIG. 6 for simplicity) associated with different users. The data table 600 also includes a second column 604 listing users respectively associated with the ranges listed in column 602, and a third column 606 listing devices respectively associated with the users and ranges.

As an example, once a bioimpedance measurement has been received from a bioimpedance sensor in contact with a user, a device may access the data table 600 and use the measurement to parse data top to bottom in the column 602 until a bioimpedance range in column 602 is reached within which the received measurement is determined to fall. The logic may then move horizontally over to column 604 first, or horizontally to column 606, to respectively identify a user (and/or identifier) associated with the measurement range and hence received measurement, and identity another device associated with the received measurement with which the device is to at least attempt to establish paired communication.

Furthermore, though not shown for clarity, a data table such as the table 600 may include other columns for identification of other information based on biometric input usable in accordance with present principles as well, such as a column respectively listing login information for various users, authentication information for various users and/or the devices listed in column 606, functions to be executed based on the various users, etc.

Without reference specifically to FIG. 6 but still in accordance with present principles, it is to be understood that in some embodiments, rather than biometric input being used by a device having a sensor that received the biometric input to then identify another device with which to establish paired communication at that device, the device having the sensor may receive the biometric input and then broadcast it so that other devices may receive it and identity the user based on the biometric input, where one or more of those other device may then seek to establish paired communication with the device having the sensors based on the biometric input.

It may now be appreciated that present principles provide for using biometric measurements, such as bioimpedance measurements, to determine who put on or contacted a device such as a smart watch, Bluetooth headset, health monitoring wearable device, etc. Then, once a user is identified based on the biometric input, the device may attempt to connect to one of that user's paired devices. Thus, for example, a wearable device may be shared among plural people but the device may change which other device it is to communicate with based on which user is wearing the device.

For example, if a person puts on a wearable device, the wearable device may identify the user based on a bioimpedance of the user's skin sensed at the wearable device and then connect to that user's smart phone for receipt text messages, whereas when the user's wife puts on the wearable device the wearable device may measure her skin's bioimpedance, identify her, and then connect to her smart phone for receipt of her text messages. As another example, if the wife puts on the husband's Bluetooth headset for engaging in a conference call through the wife's smart phone, the Bluetooth headset may automatically connect to her smart phone rather than the husband's smart phone.

In any case, it is to be understood that present principles may be applied in instances other than engagement with a wearable device having a biometric sensor, such as engagement with a laptop, smart phone, tablet, keyboard, track pad, mouse, etc. having a biometric sensor. For example, a particular laptop with which to communicate may be identified based on biometric input received through an outer surface of a mouse having a biometric sensor inside the outer surface.

Before concluding, it is to be understood that although a software application for undertaking present principles may be vended with a device such as the system 100, present principles apply in instances where such an application is downloaded from a server to a device over a network such as the Internet. Furthermore, present principles apply in instances where such an application is included on a computer readable storage medium that is being vended and/or provided, where the computer readable storage medium is not a transitory signal and/or a signal per se.

While the particular DETERMINATION OF DEVICE WITH WHICH TO ESTABLISH COMMUNICATION BASED ON BIOMETRIC INPUT is herein show and described in detail, it is to be understood that the subject matter which is encompassed by the present application is limited only by the claims.

What is claimed is:

1. A first device, comprising:
    at least one processor;
    a wireless transceiver accessible to the at least one processor;
    at least one biometric sensor accessible to the at least one processor; and
    storage accessible to the at least one processor and comprising instructions executable by the at least one processor to:
    receive first input from the at least one biometric sensor;
    based on first input from the at least one biometric sensor, identify a first user;
    based at least in part on identification of the first user based on first input from the at least one biometric sensor, determine a second device with which the first device is to communicate using the wireless transceiver;
    based on the determination of the second device with which the first device is to communicate using the wireless transceiver, communicate with the second device using the wireless transceiver and apply preferred call settings associated with the first user;
    receive second input from the at least one biometric sensor;
    based on second input from the at least one biometric sensor, identify a second user different from the first user;
    based at least in part on identification of the second user based on second input from the at least one biometric sensor, determine a third device with which the first device is to communicate, the third device being different from the first device and the second device;
    based on the determination of the third device with which the first device is to communicate using the wireless transceiver, communicate with the third device using the wireless transceiver and apply preferred call settings associated with the second user.

2. The first device of claim 1, wherein the wireless transceiver is a Bluetooth transceiver, and wherein the storage bears instructions executable by the at least one processor to:
    in response to the determination of the second device with which the first device is to communicate, establish Bluetooth communication with the second device using the Bluetooth transceiver.

3. The first device of claim 1, wherein the instructions are executable by the at least one processor to:
    determine a location of the first device; and
    determine the second device with which the first device is to communicate based at least in part on the identification of the first user and based at least in part on the determination of the location of the first device.

4. The first device of claim 1, wherein the instructions are executable by the at least one processor to:
determine a location of the second device; and
determine the second device with which the first device is to communicate based at least in part on the identification of the first user and based at least in part on the determination of the location of the second device.

5. The first device of claim 1, wherein the instructions are executable to:
based on the determination of the second device with which the first device is to communicate using the wireless transceiver, launch plural particular applications at the first device;
based on the determination of the third device with which the first device is to communicate using the wireless transceiver, launch plural particular applications at the first device.

6. The first device of claim 1, wherein the instructions are executable to:
based on the determination of the second device with which the first device is to communicate using the wireless transceiver, connect to a first electronic calendar associated with the first user;
based on the determination of the third device with which the first device is to communicate using the wireless transceiver, connect to a second electronic calendar associated with the second user.

7. The first device of claim 1, wherein the instructions are executable to:
based on the determination of the second device with which the first device is to communicate using the wireless transceiver, log the first device in to a first social networking account associated with the first user;
based on the determination of the third device with which the first device is to communicate using the wireless transceiver, log the first device in to a second social networking account associated with the second user.

8. The first device of claim 1, wherein the instructions are executable to:
determine the second device with which the first device is to communicate from amongst plural devices associated with the first user based at least in part on the second device being a most-proximate device to the first device from amongst the plural devices associated with the first user; and
determine the third device with which the first device is to communicate from amongst plural devices associated with the second user based at least in part on the third device being a most-proximate device to the first device from amongst the plural devices associated with the second user.

9. A method, comprising:
receiving first input at a first device from a biometric sensor;
based at least in part on the first input from the biometric sensor, identifying a second device with which the first device is to communicate, the second device being different from the first device;
responsive to identifying the second device with which the first device is to communicate, communicating with the second device and applying preferred call settings associated with a first user, the first user associated with the second device;
receiving second input at the first device from the biometric sensor; and
based at least in part on the second input from the biometric sensor, identifying a third device with which the first device is to communicate, the third device being different from the first device and from the second device;
responsive to identifying the third device with which the first device is to communicate, communicating with the third device and applying preferred call settings associated with a second user, the second user associated with the third device.

10. The method of claim 9, wherein the method comprises:
based at least in part on the first input from the biometric sensor, identifying the first user; and
based at least in part on the identifying of the first user, identifying the second device.

11. The method of claim 9, comprising:
responsive to identifying the second device with which the first device is to communicate, launching a particular first application; and
responsive to identifying the third device with which the first device is to communicate, launching a particular second application;
wherein the first and second applications are launched at the first device.

12. The method of claim 9, comprising:
responsive to identifying the second device with which the first device is to communicate, connecting to a first electronic calendar associated with the second device;
responsive to identifying the third device with which the first device is to communicate, connecting to a second electronic calendar associated with the third device.

13. The method of claim 9, comprising:
responsive to identifying the second device with which the first device is to communicate, logging in to a first social networking account associated with the second device;
responsive to identifying the third device with which the first device is to communicate, logging in to a second social networking account associated with the third device.

14. The method of claim 9, comprising:
identifying the second device with which the first device is to communicate from amongst plural devices associated with the first input based at least in part on the second device being a most-proximate device to the first device from amongst the plural devices associated with the first input; and
identifying the third device with which the first device is to communicate from amongst plural devices associated with the second input based at least in part on the third device being a most-proximate device to the first device from amongst the plural devices associated with the second input.

15. A computer readable storage medium (CRSM) that is not a transitory signal, the computer readable storage medium comprising instructions executable by at least one processor of a first device to:
receive first input at the first device from a biometric sensor;
based at least in part on the first input from the biometric sensor, identify a second device with which the first device is to communicate, the first device being different from the second device;
based on the identification of the second device with which the first device is to communicate, communicate with the second device and apply preferred call settings associated with a user.

16. The first device of claim 1, wherein the first device is a wearable device.

17. The CRSM of claim 15, wherein the instructions are executable to:
- identify the second device with which the first device is to communicate from amongst plural devices determined from the first input based at least in part on the second device being a most-proximate device to the first device from amongst the plural devices determined from the first input.

18. The CRSM of claim 15, wherein the instructions are executable to:
- based on the identification of the second device with which the first device is to communicate, connect to a particular electronic calendar.

19. The CRSM of claim 15, wherein the instructions are executable to:
- based on the identification of the second device with which the first device is to communicate, log in to a particular social networking account.

20. The CRSM of claim 15, wherein the instructions are executable to:
- based on the identification of the second device with which the first device is to communicate, launch a particular application identified using the first input.

* * * * *